US006889667B2

(12) United States Patent
Fritz et al.

(10) Patent No.: US 6,889,667 B2
(45) Date of Patent: May 10, 2005

(54) TANK-VENTING SYSTEM IN A MOTOR VEHICLE AND METHOD FOR CHECKING THE OPERABILITY OF THE TANK-VENTING SYSTEM

(75) Inventors: Thorsten Fritz, Gaggenau (DE); Dieter Lederer, Ludwigsburg (DE); Karl-Bernhard Lederle, Renningen (DE)

(73) Assignee: Robert Bosch GmbH, Stuttgart (DE)

( * ) Notice: Subject to any disclaimer, the term of this patent is extended or adjusted under 35 U.S.C. 154(b) by 5 days.

(21) Appl. No.: 10/378,616

(22) Filed: Mar. 5, 2003

(65) Prior Publication Data

US 2003/0213478 A1 Nov. 20, 2003

(30) Foreign Application Priority Data

Mar. 5, 2002 (DE) ........................................ 102 09 483

(51) Int. Cl.[7] ........................ B60K 15/035; F02M 25/08

(52) U.S. Cl. .................. 123/520; 123/198 D; 73/117.2; 73/118.1

(58) Field of Search ......................... 123/516, 518–521, 123/198 D; 73/117.2, 117.3, 118.1

(56) References Cited

U.S. PATENT DOCUMENTS 5,890,474 A 4/1999 Schnaibel et al.
6,112,728 A * 9/2000 Schwegler et al. ......... 123/520
6,131,550 A 10/2000 Fritz et al.
6,182,642 B1 2/2001 Ohkuma
6,234,152 B1 * 5/2001 Fritz et al. .................. 123/520
6,250,288 B1 * 6/2001 Fritz .......................... 123/520
6,644,100 B2 11/2003 Fritz et al.

FOREIGN PATENT DOCUMENTS

WO WO 01/73283 10/2001

* cited by examiner

*Primary Examiner*—Weilun Lo
(74) *Attorney, Agent, or Firm*—Walter Ottesen

(57) ABSTRACT

A method checks the operability of a tank-venting system for a motor vehicle having an internal combustion engine. The tank-venting system includes a fuel tank (10), an adsorption filter (20) and a filter line (12) connecting the adsorption filter to the fuel tank. The adsorption filter (20) has a venting line (22) and a switchover/check valve (70) is provided for closing off the venting line (22). The system includes a tank-venting valve (90) and a valve line (24) connecting the tank-venting valve to the adsorption filter. In the method, an overpressure relative to atmospheric pressure is introduced into the tank-venting system utilizing a drivable pressure source (50). An operating characteristic variable of the pressure source is detected while introducing the overpressure to determine the pressure course. A conclusion is drawn as to the presence of a leak from the pressure course. The overpressure is reduced by opening the tank-venting valve (90) and simultaneously closing said switchover/check valve (70).

7 Claims, 3 Drawing Sheets

TANK-VENTING SYSTEM IN A MOTOR VEHICLE AND METHOD FOR CHECKING THE OPERABILITY OF THE TANK-VENTING SYSTEM

BACKGROUND OF THE INVENTION

A method for checking the operability of a tank-venting system is disclosed, for example, in U.S. Pat. No. 6,131,550. A tank-venting system for a motor vehicle is, for example, disclosed in international patent application PCT/DE 01/01141, filed Mar. 23, 2001.

The maintenance of specific limit values with respect to the emission performance of vehicles having internal combustion engines is required because of national and international regulations. These regulations pertain especially to the emission of hydrocarbons. In this context, the portion of the hydrocarbons, which is emitted via a leakage of the tank-venting valve, must be taken into account and possibly be eliminated.

In overpressure methods, overpressure is introduced by means of a pressure source into the tank system, which is closed tightly with respect to the ambient. This overpressure must again be reduced after ending the diagnosis. In most cases, the overpressure is reduced to the ambient through the active charcoal filter and this takes place in that the active charcoal filter check valve is opened. With a high charge of the active charcoal filter with hydrocarbons, the danger is present that hydrocarbons can reach the ambient because of this overpressure reduction. To prevent this, it could be provided that the tightness check can be carried out only when there is a hydrocarbon charge of the active charcoal filter which is previously recognized as low. However, this would mean considerable limitations.

SUMMARY OF THE INVENTION

In view of the above, it is an object of the invention to improve a method for checking the tightness of a tank-venting system in that a pressure reduction is possible at any time and, in this way, tightness checks can be carried out at any time and especially independently of the hydrocarbon charging state of the active charcoal filter.

The method of the invention is for checking the operability of a tank-venting system for a motor vehicle having an internal combustion engine. The tank-venting system includes: a fuel tank; an adsorption filter; a filter line connecting the adsorption filter to the fuel tank; the adsorption filter having a venting line; switchover/check means for closing off the venting line; a tank-venting valve; a valve line connecting the tank-venting valve to the adsorption filter; the method comprising the steps of: introducing an overpressure relative to atmospheric pressure into the tank-venting system utilizing a drivable pressure source; detecting at least one operating characteristic variable of the pressure source while introducing the overpressure to determine the pressure course; drawing a conclusion as to the presence of a leak from the pressure course whereby a tightness check is made; and, reducing the overpressure by opening the tank-venting valve and simultaneously closing the switchover/check means.

It is a further object of the invention to provide a tank-venting system for motor vehicles which makes possible carrying out the above-mentioned method and to also realize a reduction of overpressure at any time in a technically simple manner after a tightness check independently of the charge state of the active charcoal filter.

The basic idea of the invention is to reduce the overpressure in a tank-venting system after a tightness check by opening the tank-venting valve and simultaneously closing the switchover/check means to a certain extent via the engine of the vehicle. This affords the significant advantage that, independently of the charge of the charcoal filter, no hydrocarbons can reach the ambient. Rather, these hydrocarbons are combusted in the engine. In this way, the tightness check can also be carried out for active charcoal filters, which have a higher charge, whereby the frequency of diagnosis (that is, the number of tightness checks carried out) in a pregiven time interval can be increased.

An advantageous embodiment of the method provides that the pressure source is driven also during the overpressure reduction and the operating characteristic variable of the pressure source is detected. In this way, a statement as to the pressure, which is present in the tank-venting system, can be provided without additional pressure sensors or the like being necessary.

Preferably, the switchover/check means is opened in dependence upon the operating characteristic variable detected during pressure reduction. In this way, it is avoided that a pressure is adjusted in the tank-venting system which is unwanted.

An underpressure can adjust with an open tank-venting valve and a closed switchover/check means. In order to ensure that no underpressure is present in the tank-venting system, the switchover/check means is preferably opened when the operating characteristic variable assumes a pregivable value. This value can, for example, correspond to the value for a detected fine leak. This value is assumed in the case of a fine leak as well as in the case of a tight tank. In this way, it is prevented that the tank collapses or is even only deformed whereby possible fractures could occur in the tank which could lead to leakages or the tank-venting system can become damaged in another way because of the underpressure.

As an operating characteristic variable, preferably the electric current of the pressure source (especially of a pressure pump) is detected.

The tank-venting system of the invention is characterized in that the tank-venting valve and the switchover/check means can be driven by a control unit in dependence upon a signal of an operating characteristic variable of a pressure source introducing an overpressure into the tank-venting system. In this way, any desired switching states of the tank-venting valve and of the switchover/check means are provided, especially, however, switching states of the tank-venting valve and of the switchover/check means matched to each other for reducing pressure on the one hand and for avoiding underpressures in the tank-venting system on the other hand.

The switchover/check means is preferably a switchover/check valve which is driven by the control unit and which is anyway necessary in the tightness check for switching over between a reference branch, which contains a pregivable reference member, and the tank-venting system. In this way, additional check means are unnecessary.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
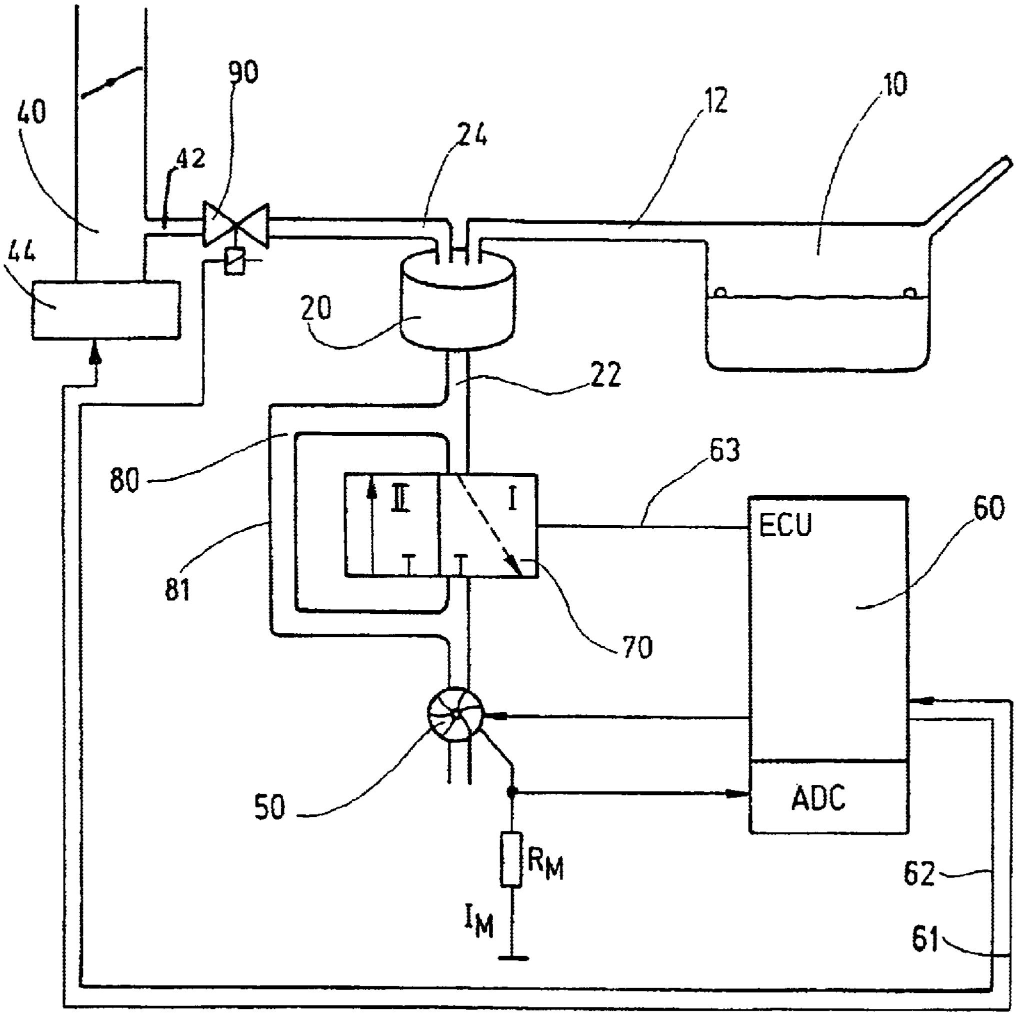
FIG. 1 is a schematic of a tank-venting system utilizing the invention.

An embodiment of a tank-venting system of a motor vehicle is shown in FIG. 1 and includes a tank 10, an adsorption filter 20 (for example, an active charcoal filter) which is connected to the tank 10 via a filter line 12. The tank-venting system further has a venting line 22 which can be connected to the ambient as well as a tank-venting valve 90 which, on the one hand, is connected to the adsorption filter 20 via a valve line 24 and, on the other hand, to an intake manifold 40 of an internal combustion engine 44 via a valve line 42. The venting line 22 can be closed by a drivable switchover/check means in the form of switchover/check valve 70. For this purpose, the switchover/check valve 70 is switched into its switch position shown in FIG. 1 by I. A pump 50 introduces a pressure into the tank-venting system so that no hydrocarbons can escape to the ambient.

Hydrocarbons develop in the tank 10 because of vaporization and these hydrocarbons deposit in the adsorption filter 20. To regenerate the adsorption filter 20, the tank-venting valve 90 is opened so that, because of an underpressure present in the intake manifold 40, air of the atmosphere is drawn by suction through the adsorption filter 20 when the switchover/check valve 70 is open (position I of the switchover/check valve 70). In this way, the hydrocarbons, which are deposited in the adsorption filter 20, are drawn by suction into the intake manifold 40 and are conducted to the engine 44.

In order to diagnose the operability of such a tank-venting system, a pressure source in the form of the pump 50 is provided which, for example, is driven by an electric motor (not shown) and pressure can be introduced into the tank-venting system via the pump. The pump 50 is driven by the circuit unit 60.

The switchover/check valve 70 is, for example, a three/two directional valve as shown in FIG. 1 and is connected downstream of the pump 50.

A reference leak 81 is arranged in a separate branch 80 parallel to this switchover/check valve 70. The size of the reference leak is so selected that it corresponds to the size of a leak to be detected. The reference leak 81 is, for example, realized by a constriction or a diaphragm in a line 80. The reference leak 81 can further, for example, be a component of the switchover/check valve 70 and can be provided by a channel constriction or diaphragm or the like in the switchover/check valve 70 so that, in this case, an additional reference branch 80 is unnecessary (not shown).

To check the tightness of the tank-venting system, the pump 50 is actuated and thereby an overpressure is introduced alternately into the reference leak 81 and into the tank-venting system via a switchover of the valve 70 from its switch position shown in FIG. 1 by I into its switching position shown on II. The switchover of the valve 70 is driven by the circuit unit 60 via a line 63. In this way, for example, the current $I_M$, which is to be supplied to the pump motor, is detected and supplied to the circuit unit 60. With a voltage drop, the current $I_M$ flows through resistor $R_M$. A conclusion can be drawn as to the tightness of the tank-venting system based on the time-dependent trace of the current $I_M$ detected in the above manner. In this connection, reference can be made to U.S. Pat. Nos. 5,890,474 and 6,131,550 which are incorporated herein by reference.

The current $I_M$ is detected in the context of a tightness check and is converted into a digital signal via an analog-to-digital converter (ADC) and is stored in a memory of the electronic control unit (ECU) 60. For a tight tank-venting system as well as a tank-venting system wherein only a small leak is present, an overpressure is present in the tank-venting system during and after the above-described tightness check and must be reduced.

In principle, the switchover/check valve 70 could be opened which means that the valve 70 is switched into the switch position shown by I in FIG. 1. However, this has the disadvantage that hydrocarbons can reach the atmosphere when the charcoal filter 20 is highly charged with hydrocarbons.

For this reason, the switchover/check valve 70 is driven by the electronic control unit 60 via a control line 63 to close, that is, the valve 70 is switched into the switch position shown by II in FIG. 1. At the same time, the tank-venting valve 90 is driven to open by the control unit 60 via the control line 62. In this way, the underpressure, which is present in the tank-venting system is reduced by means of the underpressure present in the intake manifold 40. Hydrocarbons, which are deposited in the active charcoal filter, are conducted to the internal combustion engine 44 and combusted therein.

Figure 2:
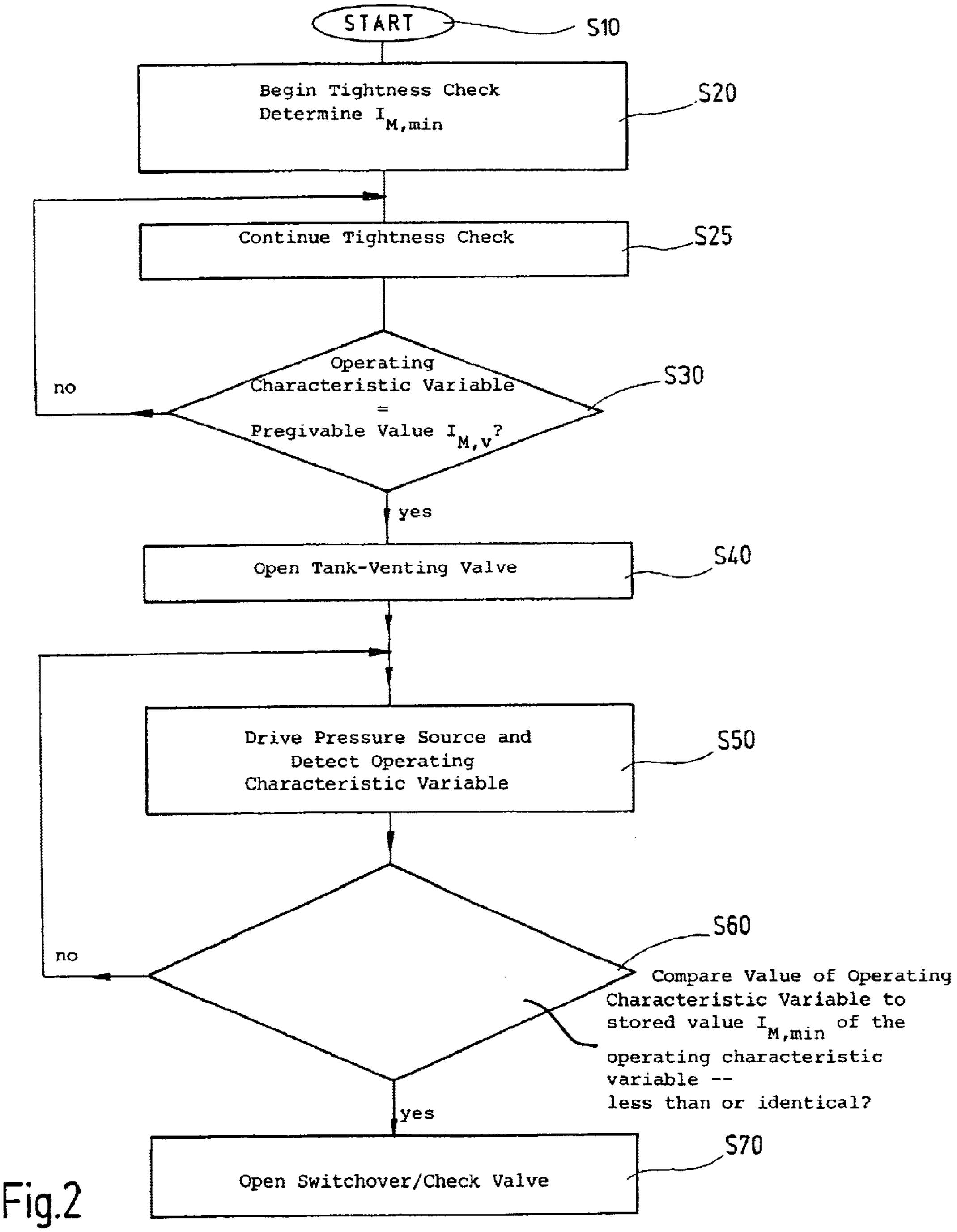
FIG. 2 is a sequence diagram of an embodiment of the method of the invention for checking the operability of a tank-venting system of a vehicle; and, FIG. 3 is a graph showing the current trace during a tightness check for determining the minimum current.
Figure 3:
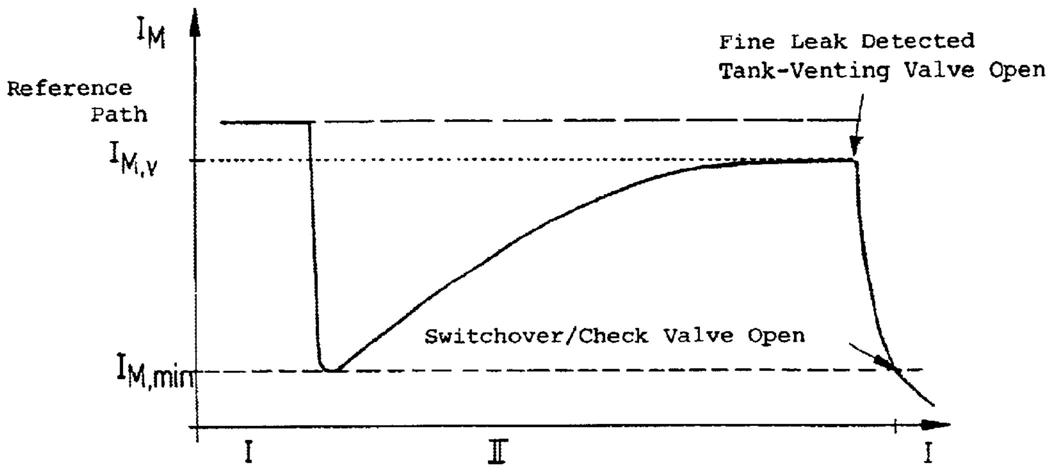

The overpressure reduction includes the following steps which are shown in the sequence diagram of FIG. 2 and which are explained in connection with FIG. 3. After the start (S10), the beginning of the tightness check (step S20) first takes place. The switchover/check valve 70 is in the switch position I shown in FIG. 1 so that the reference leak 81 is charged with pressure by the pump 50 to detect the reference current. Then, the switchover/check valve 70 is switched over into position II shown in FIG. 1 and the current $I_M$ drops abruptly. The minimum current $I_{M,min}$ which adjusts is detected (see FIG. 3) and is stored in the electronic control unit 60. Then, the tightness check is continued (step S25), that is, the tank-venting system continues to be charged with pressure by the pump 50 in the switch position II of the switchover/check valve 70 (see FIG. 1). If, for example, and as shown in FIG. 3, the detected current $I_M$ exceeds the previously detected reference current (in this case, a conclusion is drawn that no leak is present) or, as shown in FIG. 3, the detected current $I_M$ no longer changes significantly so that a steady-state current $I_{M,e}$ adjusts which is less than the reference current so that a conclusion is drawn as to a fine leak which is determined in step S30, then the tank-venting valve 90 is opened in step S40 in order to reduce the overpressure present in the tank-venting system. The pressure source in the form of pump 50 is further driven also for an open tank-venting valve 90 and the operating characteristic variable in the form of the current $I_M$, which flows through the resistor $R_M$, continues to be detected. With this continuous detection, a determination of the pressure, which is present in the tank-venting system during pressure reduction, is possible without additional sensors or the like being necessary therefor.

In a step S60, a comparison takes place between the instantaneous value of the operating characteristic variable and the minimum value $I_{M,min}$ of the operating characteristic variable which was stored in step S20. If the instantaneous value is less than or identical to the minimum value $I_{M,min}$ of the operating characteristic variable stored in step 20, the switchover/check valve 70 is opened by the electronic control unit 60 via the control line 63, that is, the valve switches into its position I shown in FIG. 1. At the same time, the tank-venting valve 90 can be driven to close via the control line 62. It is understood that the tank-venting valve in this phase can, however, remain open so that a regeneration of the active charcoal 20 can take place immediately in a manner known per se. In this way, it is prevented that an underpressure develops in the tank 10 which could lead, for example, to a deformation of the tank 10 and therefore to a possible fracture formation or other damage and, as a consequence thereof, to a leakage of the tank.

However, if the current $I_M$, which is detected in step S60, is greater than the current $I_{M,min}$ which is detected and stored in step S20, a further pressure reduction takes via the tank-venting valve 90. The pressure source 50 continues to be driven in order to detect the operating characteristic variable, that is, the current $I_M$ and the pressure in the tank-venting system.

It is understood that the tightness check as well as the overpressure reduction which follows this check can take place in dependence upon the operating state of the internal combustion engine 44 which is detected by the electronic control unit 60 via the control line 61. The control line 61 is provided as a bi-directional line also for driving the engine 44 by means of the electronic control unit 60.

The tank-venting system described above and the method for checking the tightness thereof make possible the pressure reduction via the tank-venting valve without the output of hydrocarbons to the ambient. The described method is not dependent upon the charge state of the active charcoal filter 20 with hydrocarbons. For this reason, the frequency of diagnosis in this way can be increased, that is, the number of tightness checks in a pregiven time interval can be increased and therefore the accuracy of the check of the operability of the tank-venting system can be increased.

It is understood that the foregoing description is that of the preferred embodiments of the invention and that various changes and modifications may be made thereto without departing from the spirit and scope of the invention as defined in the appended claims.

What is claimed is:

1. A method for checking the operability of a tank-venting system for a motor vehicle having an internal combustion engine, the tank-venting system including: a fuel tank; an adsorption filter; a filter line connecting said adsorption filter to said fuel tank; said adsorption filter having a venting line; a switchover/check means for closing off said venting line; a tank-venting valve; and, a valve line connecting said tank-venting valve to said adsorption filter; the method comprising the steps of:

introducing an overpressure relative to atmospheric pressure into said tank-venting system utilizing a drivable pressure source;

detecting at least one operating characteristic variable of said pressure source while introducing said overpressure to determine the pressure course;

drawing a conclusion as to the presence of a leak from said pressure course whereby a tightness check is made; and, reducing said overpressure by opening said tank-venting valve and simultaneously closing said switchover/check means.

2. The method of claim 1, comprising the further steps of:

driving said pressure source also while reducing said overpressure; and, detecting said operating characteristic variable while reducing said overpressure.

3. The method of claim 2, comprising the further step of opening said switchover/check means in dependence upon said operating characteristic variable detected during the reduction of said overpressure.

4. The method of claim 3, comprising the further step of opening said switchover/check means when said operating characteristic variable assumes a pregivable value ($I_{M,min}$).

5. The method of claim 1, comprising the further step of detecting the electric current drawn by said pressure source as said operating characteristic variable.

6. A tank-venting system for a motor vehicle having an internal combustion engine with an intake manifold, the tank-venting system comprising:

a fuel tank;

an adsorption filter;

a filter line connecting said adsorption filter to said fuel tank;

said adsorption filter having a venting line;

a switchover/check means for closing off said venting line;

a valve line connecting said adsorption filter to said intake manifold;

a tank-venting valve mounted in said valve line;

a pressure source for introducing an overpressure into said tank-venting system;

means for detecting an operating characteristic variable of said pressure source and for supplying a signal representing said operating characteristic variable; and, control unit for driving said switchover/check means and said tank-venting valve in dependence upon said signal.

7. The tank-venting system of claim 6, wherein said switchover/check means is a switchover/check valve drivable by said control unit.

* * * * *